United States Patent [19]

Earhart et al.

[11] 4,422,771

[45] Dec. 27, 1983

[54] DOWNFLOW MIXER

[75] Inventors: Jack R. Earhart, Rockton; Freddie J. Langdon, Rockford; John K. Johnson, Stillman Valley, all of Ill.

[73] Assignee: Aqua-Aerobic Systems, Inc., Rockford, Ill.

[21] Appl. No.: 312,656

[22] Filed: Oct. 19, 1981

[51] Int. Cl.³ .............................................. B01F 7/22
[52] U.S. Cl. .................................. 366/251; 366/270; 366/136; 277/205; 277/212 C
[58] Field of Search ............... 366/251, 264, 249, 245, 366/247, 270, 136, 279; 277/205, 212 C, 57, 201, 206 R, 74

[56] References Cited

U.S. PATENT DOCUMENTS

| 1,749,281 | 3/1930 | Hambleton | 277/57 |
| 2,209,287 | 7/1940 | Simpson | 366/294 |
| 2,293,183 | 8/1942 | Walker | 261/93 |
| 3,279,802 | 10/1966 | Carre | 277/57 |
| 3,606,273 | 9/1971 | Johnson | 366/263 |
| 3,856,272 | 10/1974 | Ravitts | 366/343 |

Primary Examiner—Stephen Marcus
Assistant Examiner—Brian J. Bowman
Attorney, Agent, or Firm—Vernon J. Pillote

[57] ABSTRACT

A floating downflow mixer including a float having a central float passage and a pump casing mounted on the float with its upper end spaced below the float to provide an intake at the underside of the float. A drive motor is mounted on top of the float and has an integral shaft extension extending downwardly through the float passage and a propeller mounted at its lower end in the pump casing. A shaft stabilizer tube is supported on a mounting plate attached to the top of the float and extends downwardly through the float with an anti-deflection bearing at its lower end surrounding the shaft and having a running clearance therewith to inhibit deflection of the shaft. The mounting plate seals the float passage between the stabilizer tube and float and a mechanical rotary seal seals the interface between the stabilizer tube and shaft to prevent entrance of air to the anti-deflection bearing and propeller.

22 Claims, 5 Drawing Figures

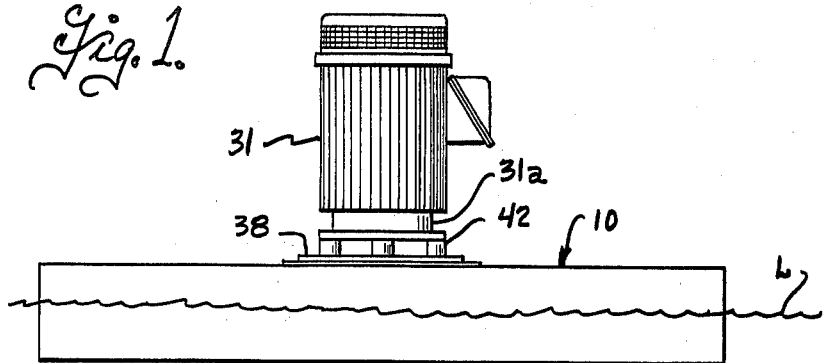
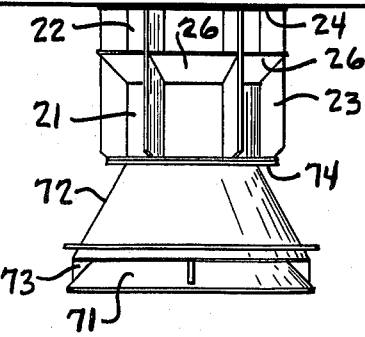
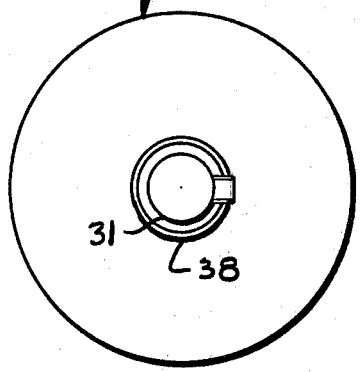
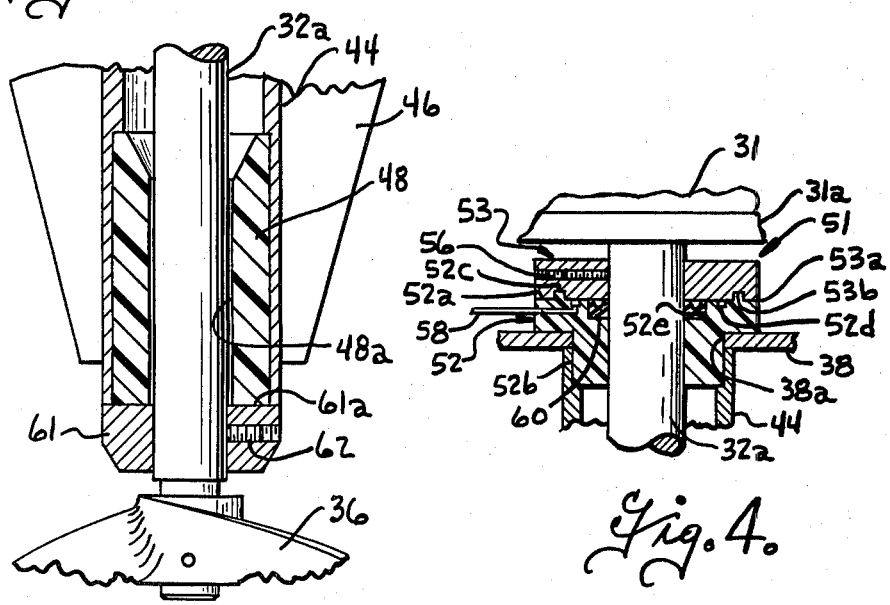

DOWNFLOW MIXER

BACKGROUND OF THE INVENTION

Downflow mixers of the type disclosed in U.K. Pat. No. 1,428,349 have heretofore been made by the assignee of the present application for mixing materials in an open surface body of liquid. In general, such prior downflow mixers included an axial flow propeller disposed in an upright tubular pump casing having its upper intake end disposed below the surface of the body of liquid and driven by a motor supported above the surface of the body of liquid. The propeller is spaced a substantial distance below the motor and, in the mixer shown in the above patent, the propeller was mounted on a separate propeller shaft that was rotatably supported in radial and axial thrust bearings and connected by a flexible coupling to the motor shaft. At least the lower propeller shaft bearing had to be located below the liquid level to support the propeller shaft adjacent the propeller and had to run submerged in the liquid being pumped. Because of the practical difficulties in sealing and lubricating an oil lubricated bearing when it is submerged in water, the lower bearing was made of the water lubricated type. However, such water lubricated bearings will fail rapidly if the supply of water to the bearing is shut off. On the other hand, the liquid being pumped in the reservoir or pond commonly contains foreign material which is abrasive in nature and which causes bearing and shaft wear and eventual bearing failure. Further, even when the propeller shaft in the prior mixer was firmly supported by the lower submerged bearing, very high levels of vibration were encountered in the mixer during operation. This vibration was sometimes so high as to cause fracture of parts of the downflow mixer due to metal fatigue in a relatively short time, sometimes after only a few weeks or months of operation.

SUMMARY OF THE INVENTION

It is the object of the present invention to overcome the problems of bearing failure and excessive vibration encountered in the prior downflow mixing apparatus.

In a downflow mixing apparatus, the motor drives a propeller at a relatively high speed, and, even though the pump inlet is submerged in the liquid, the applicant found that air would enter around the propeller shaft and produce cavitation at the propeller, which cavitation is believed to be the primary cause of the excessive vibration encountered in the prior mixer.

Accordingly, the present invention provides a downflow mixer for mixing materials in an open surface body of liquid comprising a means for supporting the mixer in a body of liquid, annular upper casing means on the mixer support means defining an upright passage extending from a level above the surface of the body of liquid to a level substantially below the surface of the body of liquid, an upright annular pump casing open at its upper and lower ends, means mounting the pump casing on the upper casing with the upper end of the pump casing spaced below the lower end of the upper casing to provide a liquid intake below the upper casing, an electric drive motor, means mounting the drive motor on the upper casing to extend upwardly therefrom, the motor having an elongated one-piece motor shaft with one portion in the motor rotatably supported by upper and lower bearings in the motor and an integral extended shaft portion extending downwardly through the float passage and into the pump casing, an axial flow propeller mounted on the lower end of the extended shaft portion in the pump casing for pumping liquid downwardly therethrough, shaft stabilizer means rigid with the motor mounting means and defining a rigid shaft enclosure surrounding the extended shaft portion and extending downwardly through the upright passage, anti-deflection bearing means on the lower end of the shaft stabilizer dimensioned to normally have a running clearance with the extended shaft portion for limiting deflection of the lower end of the extended shaft portion, wall means extending between the shaft stabilizer means and the upper casing across the upright passage for preventing passage of atmospheric air through the upright passage to the propeller, and mechanical shaft seal means between the shaft stabilizer means and the extended shaft portion at a location above the anti-deflection bearing means for preventing flow of atmospheric air through the shaft enclosure to the anti-deflection bearing means and propeller.

The mixer is advantageously buoyantly supported in the body of liquid by a float.

These, together with other objects, features and advantages of this invention will be more readily understood by reference to the following detailed description when taken in connection with the accompanying drawings wherein:

FIG. 1 is a side elevational view of a downflow mixer;

FIG. 2 is a top plan view of the mixer on a smaller scale than FIG. 1;

FIG. 4 is a fragmentary vertical sectional view showing the mechanical shaft seal between the shaft stabilizer and shaft on a larger scale than FIG. 3; and FIG. 5 is a fragmentary vertical sectional view showing the anti-deflection bearing and shaft on a larger scale than FIG. 3.

Figure 3:
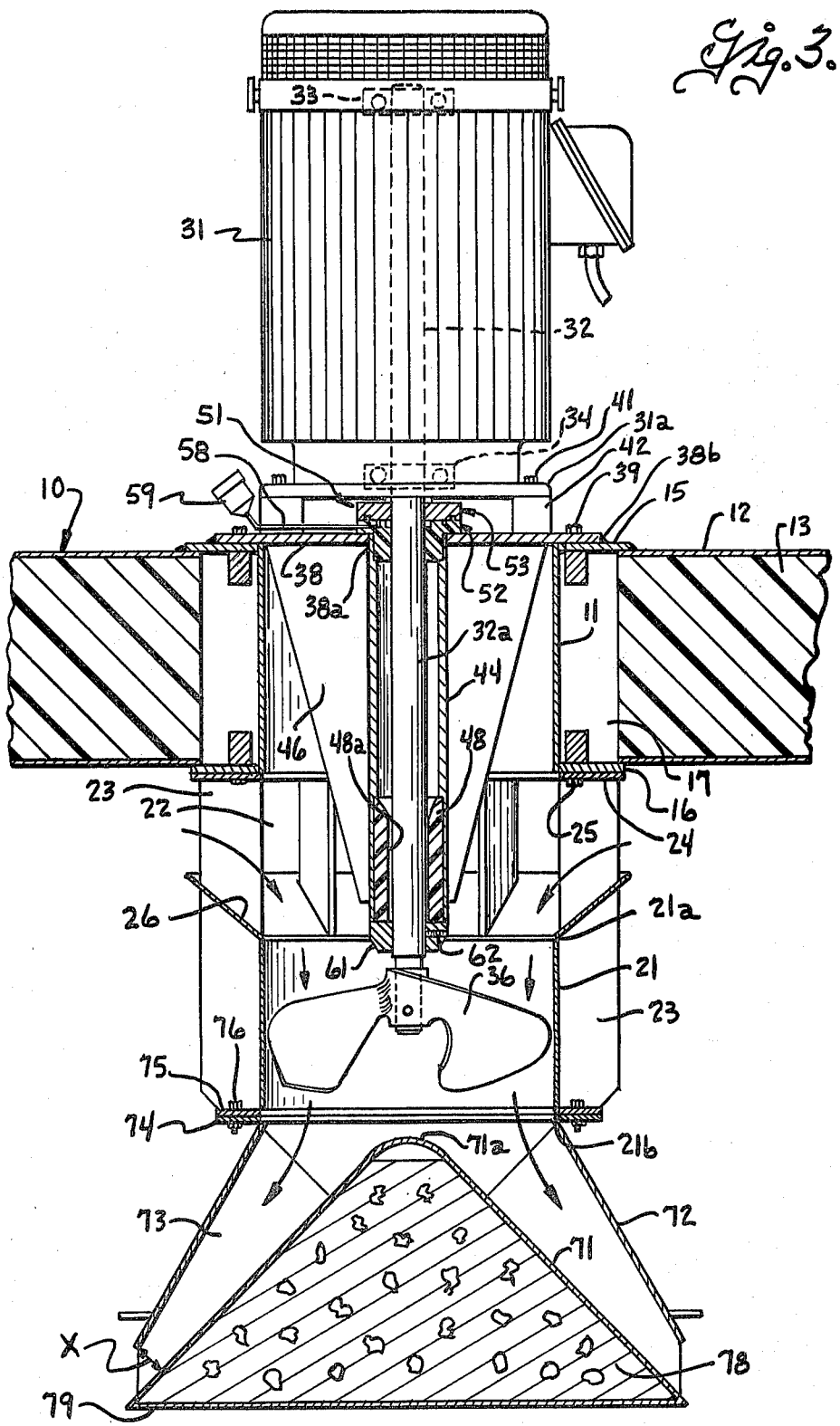
FIG. 3 is a fragmentary vertical sectional view through the downflow mixer, showing the parts on a larger scale than FIG. 1.

The downflow mixing apparatus is adapted for use in open surface bodies of liquids in tanks, ponds, basins, reservoirs for various agitating, mixing, circulating and/or blending operations herein generally referred to as mixing. The mixer may, for example, be used to mix and circulate the liquid in the basin or pond to maintain solids in suspension. The mixer can also be used for mixing other solids and/or liquids and/or gases with the body of liquid and may, for example, be used for mixing solid or liquid chemicals and/or gases such as air and air-gas mixtures with the liquid in the basin or pond.

The downflow mixer includes means for supporting the mixer in an open surface body of liquid at a preselected relation to the surface of the body of liquid. In the preferred embodiment illustrated, the mixer support means comprises a buoyant float 10 for buoyantly supporting the mixer in the body of liquid to maintain the mixer in a predetermined relation with the surface of the body of liquid. However, if the body of liquid has a substantially constant liquid level, the mixer can be rigidly supported at a fixed level relative to the surface of the body of liquid. The mixer has an annular upright upper casing 11 on the mixer support which defines an upright passage that extends from a level above the surface of the body of liquid to a level substantially below the surface of the body of liquid. In the embodiment illustrated, the float has a generally circular configuration and the casing 11 defines a passage extending vertically through the float. The float is advantageously enclosed in a sheeting 12 which may be metal, fiberglass and the like, and filled with a light weight material 13 such as closed cell polyurethene foam. As best shown in FIG. 3, the upper casing 11 is surrounded by a rigid annular support structure and which includes upper and lower mounting rings 15 and 16 that extend outwardly from the upper casing 11 and stiffening ribs 17 that extend between the upper and lower mounting rings and are secured thereto and to the casing 11 as by welding. The aforementioned support structure is rigid with the float and the upper and lower mounting rings are secured as by welding to the upper and lower sides of the metal float cover 12.

An upright annular pump casing 21, open at its upper and lower ends 21a and 21b, is mounted on the float in alignment with the upper casing 11 and with the upper end 21a of the pump casing spaced below the lower end of the upper casing to provide a liquid intake 22 below the float. The pump casing 21 is supported on the float by straps 23 that are secured as by welding at circumferentially spaced locations around the outside of the pump casing 21 and which extend upwardly therefrom and have a mounting ring 24 at their upper ends secured to the mounting ring 16 on the lower end of the upper casing 11 as by fasteners 25. As will be seen from FIGS. 1 and 3, the straps 23 are disposed in planes generally radially of the pump casing and function as intake flow straighteners to minimize turbulence in the water entering the pump casing, and a generally frusto-conical inlet cone 26 extends upwardly and outwardly from the upper end of the pump casing and terminates with its upper end spaced below the float. The underside of the float extends outwardly from the upper casing and is submerged in the body of liquid and functions as an intake shield so that the water entering the pump inlet flows generally horizontally below the float. The frusto-conical inlet cone 26 provides a transition to the generally vertical flow through the pump casing 21.

An electric drive motor 31 is mounted at the top of the upper casing and extends upwardly therefrom. As is conventional, the motor has a stator and a rotor mounted on a motor shaft 32 supported in upper and lower motor bearings 33 and 34. In accordance with the invention, the one-piece motor shaft has an integral extended shaft portion 32a that extends downwardly through the upper casing 11 and into the pump casing 21. An axial flow propeller 36, which may for example be a two or three bladed propeller, is mounted on the lower end of the shaft in the pump casing 21 and the motor is operated to drive the propeller in the direction to pump liquid from the intake opening 22 downwardly through the pump casing and through the lower outlet end 21b, as indicated by the flow arrows in FIG. 3. The motor bearings 33 and 34 are heavy duty antifriction type bearings adapted to take the entire radial and axial loading on the motor shaft, including the up-thrust produced by the propeller of the downflow mixer. Switch means (not shown) is advantageously provided to enable reversing the direction of rotation of the motor for a short time for clearing of debris that may become lodged on the propeller or other parts of the mixer.

A mounting plate 38 is detachably secured as by bolts 39 to the upper mounting ring 15 on the upper casing 11, and the mounting plate 38 extends across the upper casing and has a central opening 38a around the extended shaft portion 32a of the motor shaft. The base 31a of the motor 31 is detachably mounted as by mounting bolts 41 to spacer lugs 42 on the upper side of the plate to rigidly support the motor on the plate with its base spaced above the mounting plate. A rigid shaft stabilizer tube 44 is secured as by welding or the like to the mounting plate 38 around the opening 38a therein, and the stabilizer tube extends downwardly through the upper casing and around the extended shaft portion 32a. As best shown in FIG. 3, the stabilizer tube 44 preferably extends to a level closely adjacent the top of the pump casing 21 and gussets 46 are welded to the tube at spaced locations therearound and to the underside of the mounting plate 38 to rigidly support the tube on the mounting plate. The lower end of the stabilizer tube 44 is substantially below the surface L of the body of liquid. As best shown in FIGS. 3 and 5, an anti-deflection bearing 48 is mounted in the lower end of the shaft stabilizer tube and has an internal diameter 48a which is sufficiently larger than the external diameter of the extended shaft portion in the region adjacent the anti-deflection bearing, to normally have a running clearance therewith. For example, the anti-deflection bearing is preferably sized to normally have an internal diameter of the order of 0.030 to 0.040 inches larger than the shaft to provide about a 0.015 to 0.020 inch clearance between the shaft and anti-deflection bearing. The anti-deflection bearing itself is preferably formed of a water lubricatable bearing material and may, for example, be formed of plastic such as graphite impregnated polytetrafluorethylene. Since the anti-deflection bearing is normally spaced slightly from the shaft, it is not normally in running contact with the shaft and only functions to inhibit excessive deflection of the lower end of the extended motor shaft. Since the anti-deflection bearing is normally out of running contact with the shaft, it does not have to have a continuous supply of water to lubricate it as is required for conventional water lubricated shaft bearings.

The mounting plate 38 is made imperforate except for the central opening 38a and it is sealed to the float as by a suitable resilient sealing compound indicated at 38b in FIG. 3. The plate 38 thus forms a wall between the upper casing 11 and the stabilizer tube 44 that effectively prevents passage of atmospheric air through the casing passage to the propeller. A mechanical shaft seal 51 is used to provide a gas tight seal between the shaft stabilizer tube 38a and the extended shaft portion of the motor shaft at a location above the anti-deflection bearing to prevent the flow of atmospheric air through the stabilizer tube in the anti-deflection bearing and propeller. The mechanical shaft seal 51 is preferably located closely adjacent the motor where the shaft is firmly supported by the motor bearings 33 and 34 and is not subject to lateral deflection. In the preferred embodiment, the shaft seal 51 includes a stationary seal member 52 mounted on the shaft stabilizer tube 44 and mounting plate 38, and a rotary seal member 53 mounted on the extended motor shaft 32a. As best shown in FIG. 4, the stationary seal member has an upper seal face 52a and the rotary seal member has a lower seal face 53a overlying the upper seal face on the stationary seal member, to provide a rotary seal therebetween. The lower seal member 52 is preferably formed of a wear resistant plastic material and may, for example, be formed of graphite impregnated polytetrafluorethylene. The upper seal member 53 is preferably formed of metal such as stainless steel. As best shown in FIG. 4, the stationary seal member 52 overlies the plate 38 and has a reduced portion 52b that extends into a counterbore in the upper end of the stabilizer tube 44. The reduced extension 52b is preferably pressed into the stabilizer to hold the stationary seal member against rotation and to also provide a seal between the stationary seal member and the stabilizer tube. The upper seal member is secured to the shaft for rotation therewith as by set screw 56. In order to enhance the seal between the stationary and rotary seal members, one of the seal members such as the upper seal member 53 is advantageously provided with one or more annular recesses 53b and the other seal member such as the stationary seal member 52 is provided with one or more annular ribs 52c that extend into the recess 53b to form a labyrinth seal. To further enhance sealing action of the mechanical seal against the entrance of air and to reduce wear, provision is advantageously made for feeding a lubricant to the seal faces. For this purpose, the stationary seal member 52 is provided with an annular lubricant distribution groove 52d at its upper seal face inwardly of the groove and rib 53b, 52c, and lubricant is fed to the lubricant distribution groove through a tube 58 from a lubricant reservoir 59 (FIG. 3). The lubricant reservoir may, for example, be a grease cup or the like containing a quantity of lubricant and may have a spring loaded wall or piston (not shown) in the cup to pressurize the lubricant and provide a controlled feed of lubricant to the lubricant distribution groove. Alternatively, the reservoir may be used to contain a lubricant of low viscosity and arranged for gravity feed of lubricant to the seal faces.

In order to further enhance the sealing action of the mechanical rotary seal, and to minimize loss of lubricant, a lip-type shaft seal 60 is advantageously provided in a counterbore 52e in the stationary seal member, at a location radially inwardly of the lubricant distribution groove 52d. The lip-type shaft seal directly surrounds a shaft and forms a running seal therewith to inhibit entrance of air and to also minimize flow of lubricant along the shaft.

The mechanical rotary shaft seal 51 effectively prevents the flow of atmospheric air through the stabilizer tube 44 past the anti-deflection bearing 48 and to the propeller 36. Since the anti-deflection bearing normally has a running clearance with the shaft, it does not require a continuous supply of water to lubricate the deflection bearing. However, some water at the anti-deflection bearing is helpful to minimize wear of the anti-deflection bearing due to contact with the shaft when it is deflected. Sealing the stabilizer tube against the flow of air to the anti-deflection bearing prevents drying of the anti-deflection bearing due to the flow of air there passed. However, the anti-deflection bearing is submerged, and it is desirable to prevent the entrance of abrasive material from the liquid being pumped into the anti-deflection bearing. As best shown in FIGS. 3 and 5, a slinger 61 is secured to the extended shaft portion 32a above the propeller 36 for rotation therewith as by a set screw 62 and the slinger has an upper surface 61a in close running fit with the lower end of the anti-deflection bearing 48. The slinger may be formed of material such as stainless steel. Since the anti-deflection bearing is submerged below the liquid level, some of the liquid being pumped will tend to enter the lower anti-deflection bearing and stabilizer tube, particularly when the mixer is not in operation. However, the close running fit between the slinger 61 and the anti-deflection bearing tends to inhibit the entrance of abrasive material that might be contained in the liquid being pumped. In any event, since the rotary shaft seal 51 prevents the flow of atmospheric air into the stabilizer tube, liquid that does enter the lower end of the stabilizer tube tends to remain in the tube and there is no continuous flow of the pumped liquid through the anti-deflection bearing which could cause a build-up of solid materials thereat.

As previously described, the downflow mixer pumps the liquid from the intake 22 downwardly through the pump casing 21 and through the lower end 21a of the pump casing. The mixer can be used without any attachments on the lower end of the pump casing, if it is desired to mix materials in a relatively shallow body of liquid having a non-erodible bottom such as a steel tank or concrete reservoir. When mixing in deeper bodies of liquid, draft tube extensions (not shown) can be provided on the lower end of the pump casing to discharge the liquid at a lower level in the body of liquid. In some installations, as where the body of liquid has an erodible bottom or where wider circulation is desired, a discharge head can be provided. In the embodiment shown, a discharge cone assembly is provided to distribute the pumped liquid, which discharge cone assembly includes an inner cone 71 and an outer generally frustoconical cone 72 that are axially spaced apart to define a flow passage therebetween. The inner and outer cones are connected and spaced by gusset plates 73 and the upper end of the outer cone has a mounting ring 74 adapted to be attached to a mounting ring 75 on the lower end of the pump casing 21 as by mounting bolts 76. In the embodiment shown, the discharge cone is attached directly to the lower end of the pump casing. However, in those installations where the pond or basin is relatively deep and where it is desired to discharge the pumped liquid at a lower level in the pond or basin, one or more sections of draft tube (not shown) can be interposed between the discharge cone and the pump casing.

The liquid being pumped sometimes contains entrapped and/or dissolved air and gases and, in order to inhibit expansion of the gases at the inlet side of the pump which might contribute to cavitation, the inner and outer discharge cones 71 and 72 are preferably spaced apart a distance such that, at some location the annular flow area therebetween is made slightly smaller than the cross-sectional flow area of the pump casing to maintin a low positive head on the liquid at the outlet of the pump casing. In the embodiment illustrated in FIG. 3, the inner and outer cones 71 and 72 converge relative to each other toward their outlet ends, and the annular flow area at the location designated X in that figure is made slightly smaller, for example a few percent smaller than the cross-sectional flow area of the pump casing 21. This inhibits the expansion of dissolved air and/or other gases and further minimizes cavitation at the propeller. It has further been found that rounding of the inlet end of the lower cone as shown at 71a tends to minimize turbulence at the outlet of the propeller and aids in reducing vibration in the mixer. The mixer is further advantageously stabilized by filling the inner cone 71 with a ballast material 78 such as concrete reinforced with metal bars, and the lower end of the cone is closed as by cover plate 79 to protectively enclose the ballast material in the inner cone.

The annular upper casing 11 is made at least as large as the diameter of the propeller 36 so that the motor, propeller, mounting plate and stabilizer can be installed and removed as a unit from the float. This markedly facilitates service and repair of the mixer.

From the foregoing it is believed that the construction and operation of the downflow mixer will be readily understood. The motor directly drives the propeller, preferably at a speed in the range of about 600 to 1500 RPM, to pump liquid from the intake 22 downwardly through the pump casing 21 and out through the lower end of the pump casing. The mounting plate 38 extends across the float passage between the shaft stabilizer tube and the float to form a seal to prevent the entrance of air through the float passage, and the rotary mechanical seal 51 forms a seal between the stabilizer tube and the shaft to prevent the passage of air to the lower anti-deflection bearing 48 and to the propeller 36. A unit constructed in this manner has been built and tested and has been found to operate with an extremely low vibration level.

The embodiments of the invention in which an exclusive property or privilege is claimed are defined as follows:

1. A downflow mixer for mixing materials in an open surface body of liquid comprising, means for supporting the mixer in an open surface body of liquid, an annular upper casing on the support means defining an upright passage extending from a level above the surface of the body of liquid to a level substantially below the surface of the body of liquid, an upright annular pump casing open at its upper and lower ends, means mounting the annular pump casing on the upper casing with the upper end of the pump casing spaced below the lower end of the upper casing to provide a liquid intake below the upper casing, an electric drive motor, motor mounting means mounting the motor on the upper casing to extend upwardly therefrom, the motor having an elongated one-piece motor shaft with one portion in the motor rotatably supported in upper and lower bearing means in the motor and an extended shaft portion extending downwardly through the upright passage and into the pump casing, an axial flow propeller mounted on the lower end of the extended shaft portion in the pump casing for pumping liquid downwardly therethrough, said motor bearing means being constructed and arranged to carry the entire radial and axial loading on said motor shaft including the end thrust on the shaft produced by said propeller, shaft stabilizer means rigid with said motor mounting means and defining a rigid shaft enclosure surrounding said extended shaft portion and extending downwardly through said upright passage, anti-deflection bearing means on the lower end portion of said shaft stabilizer means dimensioned to normally have a running clearance with said extended shaft portion for limiting deflection of the lower end of said extended shaft portion, wall means extending between the shaft stabilizer means and the upper casing across said upright passage for preventing passage of atmospheric air through the upright passage to the propeller, and mechanical shaft seal means between the shaft stabilizer means and the extended shaft portion at a location above the anti-deflection bearing means for preventing the flow of atmospheric air through said shaft enclosure to the anti-deflection bearing means and propeller.

2. A downflow mixer according to claim 1 wherein said anti-deflection bearing means is located below the lower end of said upper casing.

3. A downflow mixer according to claim 1 wherein said mechanical shaft seal means is located adjacent the upper end of said upper casing.

4. A downflow mixer according to claim 1 wherein said anti-deflection bearing means is located below the lower end of said upper casing and said mechanical shaft seal means is located adjacent the upper end of said upper casing.

5. A downflow mixer according to claim 4 wherein said mechanical shaft seal means includes a stationary seal member mounted on said shaft stabilizer means and having an upper seal face and a rotary seal member mounted on said shaft extension for rotation therewith and having a lower seal face overlying the upper seal face on the stationary seal member to provide a rotary seal therebetween.

6. A downflow mixer according to claim 5 wherein one of said seal members has at least one annular coaxial groove in its seal face and the other of the seal members has at least one annular coaxial rib extending into the groove in said one of said seal members to provide a labyrinth seal.

7. A downflow mixer according to claim 5 including means for feeding lubricant to the inter-engaging upper and lower seal faces on said stationary and rotary seal members.

8. A downflow mixer according to claim 7 wherein said lubricant feed means includes a lubricant distribution recess in the upper seal face on the stationary seal member, and means defining a lubricant reservoir communicating with said lubricant distribution recess and constructed and arranged to feed lubricant thereto.

9. A downflow mixer according to claim 5 including a second mechanical shaft seal means mounted on said stationary seal member and engaging said extended shaft portion at a location below said rotary seal member.

10. A downflow mixer according to claim 1 wherein said means for supporting the mixer comprises a float attached to said upper casing and extending outwardly therefrom for buoyantly supporting the mixer in the body of liquid.

11. A floating downflow mixer for mixing materials in an open surface body of liquid comprising, a float for buoyantly supporting the mixer in an open surface body of liquid and having an upright float passage extending through the float from top to bottom thereof, an upright annular pump casing open at its upper and lower ends, means mounting the annular pump casing on the float with the upper end of the pump casing spaced below the underside of the float to provide a liquid intake below the float, and electric drive motor, motor mounting means mounting the motor on the float to extend upwardly therefrom, the motor having an elongated one-piece motor shaft with one portion extending into the motor and rotatably supported in upper and lower bearing means in the motor and extended shaft portion extending downwardly through the float passage and into the pump casing, an axial flow propeller mounted on the lower end of the extended shaft portion in the pump casing for pumping liquid downwardly therethrough, said motor bearing means being constructed and arranged to carry the entire radial and axial loading on said motor shaft including the end thrust on the shaft produced by said propeller, shaft stabilizer means rigid with said motor mounting means and defining a rigid shaft enclosure surrounding said extended shaft portion and extending downwardly through said float passage, anti-deflection bearing means on the lower end portion of said shaft stabilizer means dimensioned to normally have a running clearance with said extended shaft portion for limiting deflection of the lower end of said extended shaft portion, wall means extending between the shaft stabilizer means and the float across the float passage for preventing passage of atmospheric air through the float passage to the propeller, and mechanical shaft seal means between the shaft stabilizer means and the extended shaft portion at a location above the anti-deflection bearing means for preventing the flow of atmospheric air through said shaft enclosure to the anti-deflection bearing means and propeller.

12. A floating downflow mixer according to claim 11 wherein said anti-deflection bearing means is located below the float.

13. A floating downflow mixer according to claim 11 wherein said mechanical shaft seal means is located adjacent the top of the float.

14. A floating downflow mixer according to claim 11 wherein said anti-deflection bearing means is located below the float and said mechanical shaft seal means is located adjacent the top of the float.

15. A floating downflow mixer according to claim 14 wherein said mechanical shaft seal means includes a stationary seal member mounted on said shaft stabilizer means and having an upper seal face and a rotary seal member mounted on said shaft extension for rotation therewith and having a lower seal face overlying the upper seal face on the stationary seal member to provide a rotary seal therebetween.

16. A floating downflow mixer according to claim 15 wherein one of said seal members has at least one annular coaxial groove in its seal face and the other of the seal members has at least one annular coaxial rib extending into the groove in said one of said seal members to provide a labyrinth seal.

17. A floating downflow mixer according to claim 15 including means for feeding lubricant to the interengaging upper and lower seal faces on said stationary and rotary seal members.

18. A floating downflow mixer according to claim 17 wherein said lubricant feed means includes a lubricant distribution recess in the upper seal face on the stationary seal member, and means defining a lubricant reservoir communicating with said lubricant distribution recess and constructed and arranged to feed lubricant thereto.

19. A floating downflow mixer according to claim 15 including a second mechanical shaft seal means mounted on said stationary seal member and engaging said extended shaft portion at a location below said rotary seal member.

20. A floating downflow mixer according to claim 11 including a hub on said extended shaft portion above said propeller and positioned closely adjacent the lower end of the anti-deflection bearing means to inhibit entrance to the anti-deflection bearing means of foreign material in the liquid being pumped.

21. A floating downflow mixer for mixing materials in an open surface body of liquid comprising a float for buoyantly supporting the mixer in an open surface body of liquid and having an upright float passage extending through the float from top to bottom thereof, an upright annular pump casing open at its upper and lower ends, means mounting the annular pump casing on the float with the upper end of the pump casing spaced below the underside of the float to provide a liquid intake below the float, the float passage being aligned with said pump casing and having a cross-section at least as large as the pump casing, a mounting plate detachably secured to the upper side of the float to extend across said float passage and having a central opening therethrough, a shaft stabilizer tube rigidly secured to said motor mounting plate in sealed relation thereto around said central opening therein and extending downwardly through said float passage to a level below the float, an electric drive motor, the motor having an elongated one-piece motor shaft with one portion extending into the motor and rotatably supported in upper and lower bearings in the motor and an integral extended shaft portion, means mounting the motor on the motor mounting plate to extend upwardly therefrom and with the extended shaft portion extending downwardly through the shaft stabilizer tube and into the pump casing, an axial flow propeller mounted on the lower end of the extended shaft portion in the pump casing for pumping liquid downwardly therethrough, said motor bearing means being constructed and arranged to carry the entire radial and axial loading on said motor shaft including the end thrust produced by said propeller, anti-deflection bearing means on the lower end portion of said stabilizer tube dimensioned to normally have a running clearance with said extended shaft portion for limiting deflection of said extended shaft portion, said motor mounting plate being imperforate between said central opening and said float and means for sealing the motor plate to the float around the float passage to prevent flow of atmospheric air through the float passage to the propeller, and mechanical shaft seal means between the shaft stabilizer tube and the extended shaft portion at a location adjacent the motor mounting plate for preventing the flow of atmospheric air through the shaft stabilizer tube to the anti-deflection bearing means and propeller.

22. A float, pump and motor assembly according to claim 21 wherein the lower end of said stabilizer tube is disposed adjacent the upper end of said pump casing.

* * * * *